United States Patent [19]

Fasano

[11] 4,265,345

[45] May 5, 1981

[54] CONTROL MECHANISM FOR PARKING BRAKE

[75] Inventor: Osvaldo Fasano, Villarbasse, Italy

[73] Assignee: Studi Apparecchiature E Ricerche Tecniche, Turin, Italy

[21] Appl. No.: 961,825

[22] Filed: Nov. 17, 1978

[30] Foreign Application Priority Data

Nov. 22, 1977 [IT]  Italy .............................. 69635 A/77

[51] Int. Cl.³ .............................................. B60K 41/20
[52] U.S. Cl. ................................................... 192/3 R
[58] Field of Search .................. 192/3 R, 2; 74/501 R

[56] References Cited

U.S. PATENT DOCUMENTS

| | | | |
|---|---|---|---|
| 2,723,009 | 11/1955 | Kordal et al. ........................ | 192/3 R |
| 2,959,261 | 11/1960 | Hemphill ............................. | 192/3 R |
| 3,358,797 | 12/1967 | Walton ............................ | 192/3 R X |
| 3,684,049 | 8/1972 | Kimura ........................... | 192/3 R X |
| 3,709,344 | 1/1973 | Sieren .............................. | 192/3 R X |
| 3,830,328 | 8/1974 | Schaefer ......................... | 192/3 R X |
| 3,844,183 | 10/1974 | Wilke .............................. | 192/3 R X |

*Primary Examiner*—Philip C. Kannan
*Attorney, Agent, or Firm*—Sughrue, Rothwell, Mion, Zinn and Macpeak

[57] ABSTRACT

A parking brake of a motor vehicle is operable by a pedal lever through a cable linkage which is attached to a ratchet-adjustable anchorage, movement of the pedal being rendered unidirectional by a pawl and ratchet device which is engaged until the pawl is disengaged by the driver, so that until the pawl is released, either mechanically or electromagnetically, the brake pedal lever is prevented from release after the parking brake has been applied, the brake control mechanism acting in effect as an anti-theft parking brake. When the pawl is released the mechanism acts as an emergency brake.

8 Claims, 5 Drawing Figures

CONTROL MECHANISM FOR PARKING BRAKE

The present invention relates to a control mechanism for a parking brake of a motor vehicle.

The object of the present invention is to provide a control mechanism for a parking brake of a motor vehicle which is simpler and more economical to manufacture than known types of such mechanisms, which is easy to reach and to operate by the driver and which is reliable.

According to the present invention, there is provided a control mechanism for a parking brake of a motor vehicle, characterised in that it comprises:

a flexible transmission comprising a control cable slidable in a sheath, the cable being connected at one end to a brake member to control the operation of the parking brake and the sheath being fixed at its end adjacent the control lever to the vehicle body by an adjustable anchorage, the opposite end of the sheath abutting the brake member;

adjustment means for adjusting the said adjustable anchorage to vary the position of the associated end of the sheath with respect to the vehicle body;

a control lever connected to the other end of control cable and pivotally mounted on a pivot carried by the vehicle body such that application of pressure to one end thereof pivots the lever about its pivot to actuate the parking brake, through the cable, the lever having a peripherally toothed portion remote from the said one end;

a locking pawl urged into engagement with the toothed portion to prevent pivoting of the lever in the sense opposite to that which effects braking;

means for urging the pawl into engagement with the toothed portion;

a release mechanism for releasing the pawl from engagement with the toothed portion including a lever arm carrying a pin on which the pawl is pivotally mounted, said arm being pivotally mounted on a pivot pin carried by the vehicle body, and means for pivoting the lever arm from a first position in which the pawl is engaged with the toothed portion to a second position in which the pawl is released from engagement therewith; and resilient biasing means for urging the pawl about its pivot pin into a predetermined orientation with respect to the lever arm.

Preferably the means for pivoting the pawl carrying the lever arm comprise a rod having a pivotal connection at one end to the lever arm and supported for axial displacement relative to a fixed part of the vehicle, the said rod being displaceable by the action of the driver between two extreme positions, in one of which the pawl carried by the lever arm is engaged with the corresponding toothed portion of the control lever and in the other of which the pawl is disengaged from the said toothed portion. The rod may be displaceable by a driver-operable button fitted with a lock having a key to release the button for operation by the driver. In an alternative embodiment of the invention movement of the pawl-release rod may be effected by an electromagnet which acts upon the free end of the said rod and which is energisable by a control switch inserted in an electric circuit and operable by the driver.

In use of a mechanism of the invention, the operation of the control lever by the driver actuates the brakes through the control cable. If the lever arm is in its first position in which the pawl is engaged with the toothed portion of the control lever, the lever will be prevented from returning to its original position and the brakes will remain locked on until the locking pawl is released by the driver. In this condition the mechanism operates as an antitheft parking brake. If, however, the lever arm is in its second position, the lever will be allowed to return to its original position on release of the pressure on the lever, due to the reaction of the cable sheath against the associated brake member. In this condition the mechanism is operable as an emergency brake.

Two embodiments of the invention will now be more particularly described by way of example, with reference to the accompanying purely diagrammatic drawings, in which.

Figure 1:
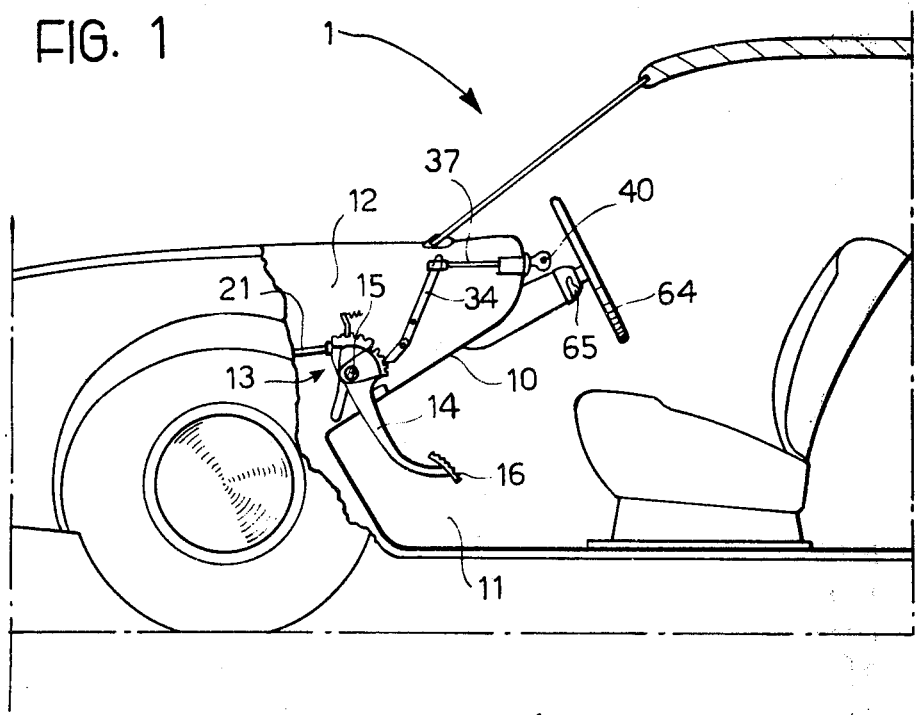
FIG. 1 is a partial schematic view of a motor vehicle fitted with a parking brake control mechanism according to the invention.

Referring to FIG. 1 of the drawings, a motor car is shown having a front engine compartment 12 divided from the front area 11 of the passenger compartment by a partition 10. A control mechanism for controlling the operation of a parking brake is shown generally indicated 13.

The mechanism 13 includes a lever 14 pivotally mounted adjacent one end on a pivot pin 15, fixed to the car body and having at its other end a pedal 16 for operation by the car driver. A cam 17, which has a peripheral portion formed with ratchet teeth 18 is also pivotable on the pin 15 and is fixed to one side of the control lever 14 by pins which pass through a corresponding number of holes in the cam 17 and the lever 14.

An upper surface 19 of the lever 14 remote from the pedal 16 is rounded and provides a bearing surface along which a flexible transmission 21, comprising an outer sheath 22 and an inner cable 20 passes, the cable 20 being fixed at one end 20a to a lug 17a carried by the cam 17. The opposite end 20b of the cable 20 is connected to a lever 23 (see inset in FIG. 2) which, in a manner known per se, controls the displacement of the shoes 24 of a shoe brake 25. The sheath 22 is also fixed at one end 22b to the lever 23 and is fixed at its opposite end 22a to a lug 26 carried by an arm 27 located on the opposite side of the lever 14 from the cam 17 and also mounted on the pin 15 for pivotal movement relative to the lever 14. The arm 27 also has a toothed peripheral portion 28, the teeth of which face in the opposite circumferential direction to the teeth 18 of the cam 17. A pawl 29, mounted on a pin 30 carried by the car body for pivotal movement about an axis parallel to that of the pin 15 is urged into engagement with the teeth 28 by a spring 31. The arm 27 is manually rotatable and can be engaged in one of a plurality of positions determined by its teeth 28 and the pawl 29; the angular position of the arm 27 may thus be adjusted to vary the anchorage position of the end 22a of the sheath 22.

A further pawl 32, engageable with the teeth 18 of the arm 12, is pivotally mounted on a pin 33 carried adjacent a lower end of a channel-section lever 34 pivotally mounted intermediate its ends on the car body by a pin 35, the axes of the pins 33 and 35 again being parallel to that of the pin 15. The pawl 32 is urged into contact with the base of the channel-section of the lower end portion of the lever 34 by a spring 44. The pawl 32 is urged into engagement with the teeth 18 of the cam 17 by means of a spring 46 which acts on the arm of the lever 34 opposite that end carrying the pawl 32.

Figure 2:
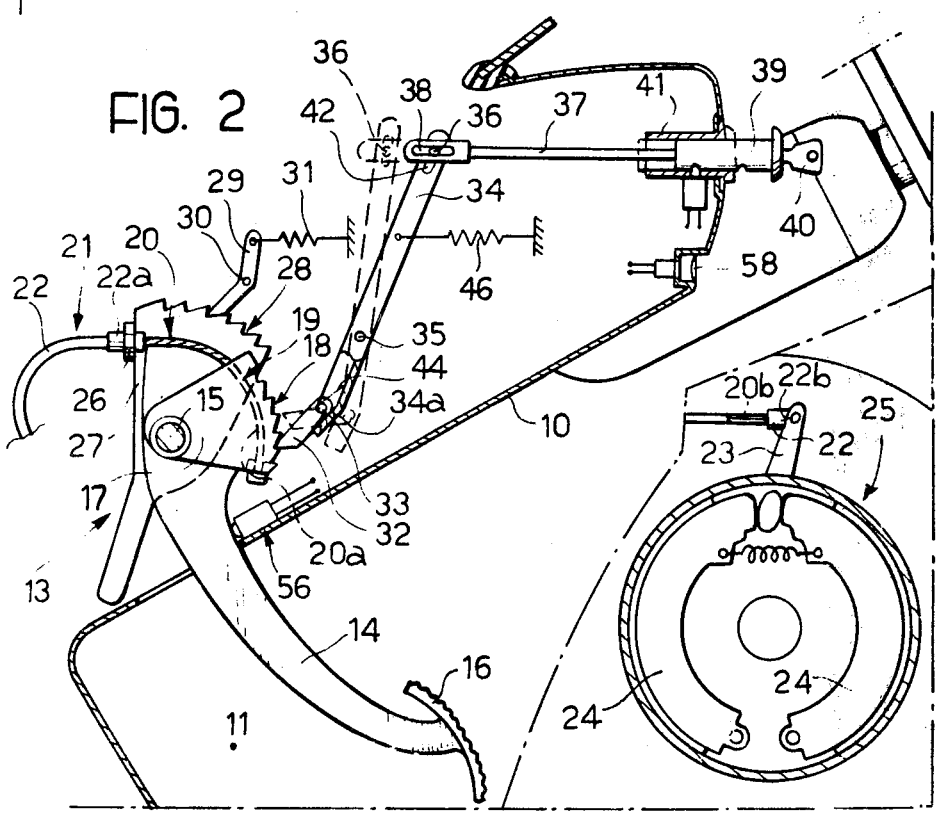
FIG. 2 is a partial view, on an enlarged scale, of the parking brake control mechanism of FIG. 1.

The lever 34 is provided at its upper end, remote from the pawl 32, with an oval slot 42 for connection with a rod 37 which also has an oval slot 38 adjacent its forward end, the lever 34 and rod 37 being interconnected by a pin 36 which passes through the two slots 38, 42. The rod 37 extends rearwardly of the lever 34 and is fixed at its rear end to a block 39, provided with a lock operable by an ignition key 40 of the motor car. The block 39 is slidable axially in a seat 41 fixed to the car body between two extreme positions, displacement of the block 39 causing corresponding axial displacement of the rod 37 and, because of the connecting pin 36, pivoting of the lever 34 about the pin 35. The two extreme positions of the block 39 thus correspond to two extreme positions of the lever 34, a rear position with respect to the car, shown in full outline in FIG. 2, and a forward position, shown in broken outline. The key 40 can be removed from the lock in the block 39 only in the extreme rear position of the block 39. The mechanism functions as follows. Under normal operating conditions the block 39 is kept in its rear position by the action of the spring 46, the pawl 32 being in engagement with the teeth 18 of the cam 17. The application of pressure to the pedal 16 by the driver rotates the lever 14 and attached cam 17 to pull the cable 20 of the flexible transmission 21 and operate the brakes, the pawl 32 allowing this rotation in the clockwise sense, as seen in FIG. 2, but engaging the teeth 18 to prevent rotation in the anticlockwise direction so that the brakes remain on even when pressure on the pedal 16 is released. To release the brakes, the driver must push the block 39 into its extreme forward position thus disengaging the pawl 32 from the teeth 18 to allow the lever 14 and cam 17 to rotate back to their initial, idle position. Release of the pressure on the block 39 then allows the block to return to its extreme rear position under the action of the spring 46. Removal of the key 40 from the block 39 now ensures that the pawl 32 cannot be disengaged from the teeth 18 and hence the brake 25 operated by the lever 14 cannot be disengaged: the mechanism thus acts as an anti-theft parking brake.

The block 39 may alternatively be locked in its extreme forward position against the action of the spring 46 by operation of the key 49 such that the pawl 32 is disengaged from the teeth 18 and the lever 14 can be operated in the same way as the control lever of an ordinary brake, the brake, under these conditions, having the function of an emergency brake.

Figure 3:
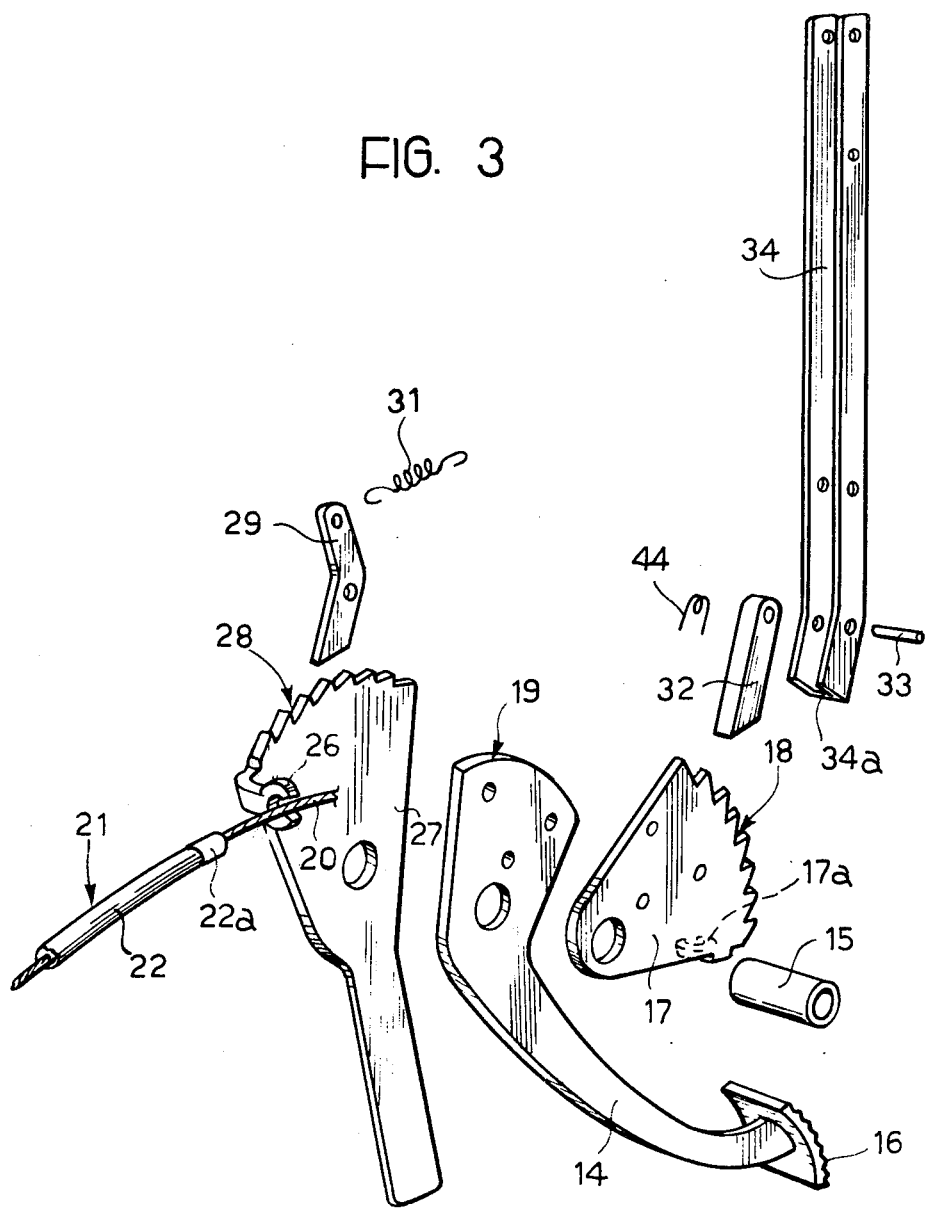
FIG. 3 is an exploded view on an enlarged scale, of part of the mechanism of FIG. 2.
Figure 4:
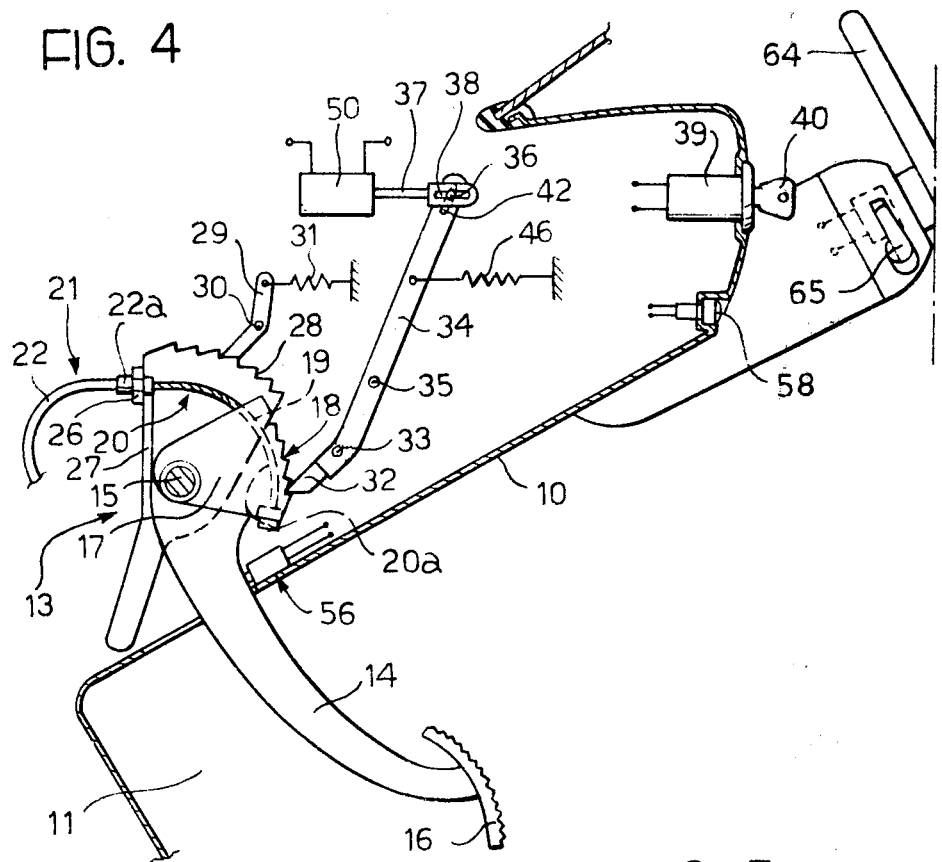
FIG. 4 is a view similar to FIG. 2 of a second embodiment of the invention.
Figure 5:
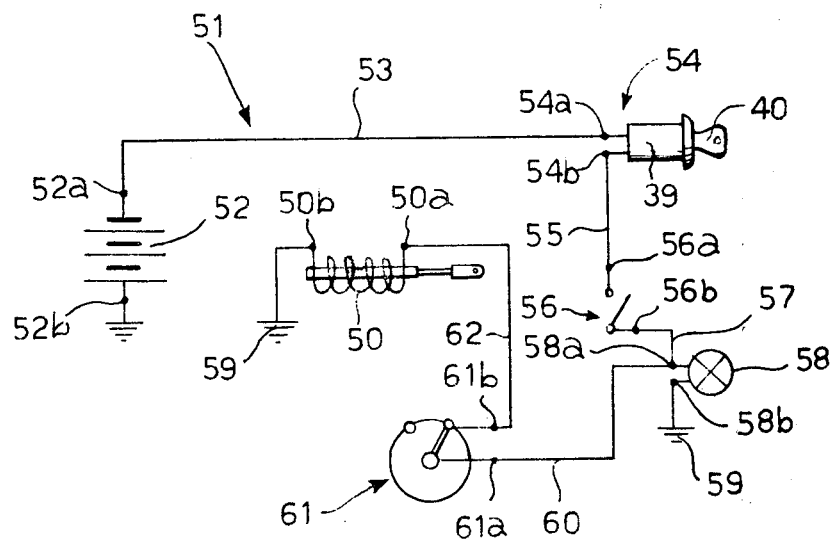
FIG. 5 is an electrical control circuit applicable to the embodiment of FIG. 4.

Referring to FIGS. 4 and 5, of the drawings, elements similar to those described above with reference to FIGS. 1 to 3, are indicated by the same reference numerals. In the embodiment of FIGS. 4 and 5, the rod 37 which acts on the lever 34 is operated, not directly as in the above embodiment, but via an electromagnet 50, the electrical circuit 51 of which is shown in FIG. 5. This circuit is powered by a battery 52, one terminal 52b of which is connected to earth, while the other terminal 52a is connected by a wire 53 to a terminal 54a of a switch 54 incorporated in the block 39. The switch 54 is so arranged that it is opened, breaking the circuit 51, when the key 40 is removed from the block 39, the key 40 in this case being the vehicle3 s ignition key.

The other terminal 54b of the switch 54 is connected by a wire 55 to a terminal 56a of a further switch 56, located adjacent the lever 14, to be operated thereby: the switch 56 is closed when the lever 14 is rotated in the clockwise sense by depression of the pedal 16 to activate the associated brake; the other terminal 56b of the switch 56 is connected by a wire 57 to a terminal 58a of an indicator light 58, the other terminal 58b of which is connected to earth 59. The terminal 58a is also connected by a wire 60 to a terminal 61a of a control switch 61, the other terminal 61b of the switch 61 being connected by a wire 62 to one terminal 50a of the electromagnet 50, the other terminal 50b of which is connected to the earth 59.

The control switch 61 is located adjacent the steering wheel 64 of the motor car and is operable by means of a manual lever 65.

The electromagnet 50 is so arranged that, when it is de-energised, the lever 34 can rotate into its extreme rear position under the action of the spring 46 to engage the pawl 32 with the teeth 18 of the cam 17, energisation of the electromagnet 50 causing displacement of the bar 37 and hence of the lever 34 into the forward position to disengage the pawl 32 from the cam teeth 18.

In use of the mechanism, under normal operating conditions the key 40 is inserted in the block 39 to close the switch 54. Depression of the pedal 16 to operate the lever 14 closes the switch 56 and also operates the parking brake; as long as the switch 61 remains open, the lever 14 will be maintained in the braking position by the engagement of the pawl 32 with the cam teeth 18. The parking brake may now be released by operation of the lever 65 by the driver to close the switch 61, thereby completing the electrical circuit and energising the electromagnet 50; this causes displacement of the lever 34 against the action of its biassing spring 46 and therefore disengagement of the pawl 32 and opening of the switch 56, allowing the parking brake to be released. In this condition, with the switch 61 closed, the brake acts as an emergency brake, since the switch 56 will be closed and the electromagnet 50 energised whenever the lever 14 is moved into its braking position.

When the key 40 is removed from the block 39 the circuit 51 is opened and the pawl 32 is engaged with the teeth 18. On depression of the pedal 16, the parking brake will be operated and will then remain in operation, so that the control mechanism of this embodiment again acts as an anti-theft parking brake.

I claim:

1. A control mechanism for a parking brake of a motor vehicle, comprising in combination:
   flexible transmission means comprising a sheath and a control cable slidable in said sheath;
   a brake member connected to one end of said cable and controlling a control lever; the operation of the parking brake; adjustable anchorage means attached to the end of the sheath adjacent the control lever for attaching said sheath end to the vehicle body, the opposite end of said sheath abutting the brake member;
   adjustment means for adjusting said adjustable anchorage means to vary the position of the associated end of the sheath with respect to the vehicle body;
   said control lever connected to the other end of said control cable and pivotally mounted on the vehicle body whereby the application of pressure to one end of said control lever pivots the lever and actuates the parking brake through the cable, said control lever having a peripherally toothed portion remote from the said one end;

a locking pawl urged into engagement with said toothed portion to prevent pivoting of the lever in the sense opposite to that which effects braking;

means for urging said locking pawl into engagement with the toothed portion;

a release mechanism for releasing the pawl from engagement with the toothed portion, including a lever arm carrying a pin on which the locking pawl is pivotally mounted, said arm having pivot means carried by the vehicle body, and means for pivoting the lever arm from a first position in which the pawl is engaged with the toothed portion to a second position in which the pawl is released from engagement therewith; and resilient biasing means urging said locking pawl about its pivot pin into a predetermined orientation with respect to the lever arm.

2. The mechanism defined in claim 1, wherein the adjustable anchorage means for the sheath comprises an arm to which the said end of the sheath is anchored, the said arm being pivotally mounted on the vehicle body, and having a toothed peripheral portion, the adjustment means comprising a stop pawl having resilient biassing means urging the stop pawl into engagement with the toothed peripheral portion, the said arm being rotatable to engage the stop pawl with a different tooth of the toothed peripheral to adjust the angular position of the arm and hence the position of the end of the sheath anchored to the arm.

3. The mechanism defined in claim 1 or claim 2, wherein the means urging the locking pawl into engagement with the toothed portion comprise a spring acting at one end on the pawl-carrying lever arm and at its opposite end upon a fixed part of the vehicle.

4. The mechanism defined in claim 1, wherein the means for pivoting the pawl-carrying lever arm comprise a rod having a pivotal connection at one end to the lever arm and supported for axial displacement relative to a fixed part of the vehicle, the said rod being displaceable by the action of the driver between two extreme positions, in one of which the locking pawl carried by the lever arm is engaged with the corresponding toothed portion of the control lever and in the other of which said pawl is disengaged from the said toothed portion.

5. The mechanism defined in claim 4, including a driver-operable button fitted with a lock having a key to release the button for operation by the driver, said button being operatively connected to the pawl-release rod to release the latter upon operation of the button by the driver.

6. The mechanism defined in claim 4, including an electromagnet which acts upon the free end of the pawl-release rod and a control switch operable by the driver for controlling the energisation of said electromagnet.

7. The mechanism defined in claim 6, including a switch unit in series with the control switch and operable by the ignition key of the motor vehicle, the said switch unit being closed when the ignition key is inserted and open when the ignition key is withdrawn.

8. The mechanism defined in claim 7, including a warning light inserted in circuit with said switch unit and adapted to be located on the dashboard of the motor vehicle, and a switch controlled by the control lever of the mechanism, the said switch being closed when the said control lever is moved towards the braking position.

* * * * *

UNITED STATES PATENT AND TRADEMARK OFFICE
CERTIFICATE OF CORRECTION

PATENT NO. : 4,265,345
DATED : May 5, 1981
INVENTOR(S) : Osvaldo FASANO

It is certified that error appears in the above—identified patent and that said Letters Patent is hereby corrected as shown below:

On the title page, Assignee should read:

--START S.p.A. - STUDI APPARECCHIATURE E RICERCHE TECNICHE, Turin, Italy--

Signed and Sealed this

Thirteenth Day of April 1982

|SEAL|

Attest:

GERALD J. MOSSINGHOFF

Attesting Officer

Commissioner of Patents and Trademarks